United States Patent
Narikawa (10) Patent No.: US 10,225,464 B2
(45) Date of Patent: Mar. 5, 2019

(54) IMAGE PROCESSING APPARATUS, IMAGE PROCESSING METHOD, AND NON-TRANSITORY COMPUTER-READABLE STORAGE MEDIUM HAVING STORED THEREON IMAGE PROCESSING PROGRAM FOR CORRECTING AN IMAGE FOR PROJECTION

(71) Applicant: CASIO COMPUTER CO., LTD., Shibuya-ku, Tokyo (JP)

(72) Inventor: Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/902,997

(22) Filed: Feb. 22, 2018

(65) Prior Publication Data

US 2018/0278840 A1 Sep. 27, 2018

(30) Foreign Application Priority Data

Mar. 27, 2017 (JP) ................... 2017-060319

(51) Int. Cl.
*H04N 5/232* (2006.01)
*G03B 17/54* (2006.01)
*H04N 9/31* (2006.01)

(52) U.S. Cl.
CPC ......... *H04N 5/23229* (2013.01); *G03B 17/54* (2013.01); *H04N 5/23216* (2013.01);
(Continued)

(58) Field of Classification Search
CPC .. H04N 5/23229; H04N 5/23216; H04N 9/31; H04N 9/3182; H04N 9/3185; H04N 9/3194; G03B 17/54; G06T 3/005
See application file for complete search history.

(56) References Cited

U.S. PATENT DOCUMENTS

| 8,003,927 | B2 | 8/2011 | Kondo et al. |
| 9,807,356 | B1 * | 10/2017 | Minami ............... H04N 9/3194 |

(Continued)

FOREIGN PATENT DOCUMENTS

| JP | 2016015639 A | 1/2016 |
| JP | 2016096516 A | 5/2016 |

(Continued)

OTHER PUBLICATIONS

Extended European Search Report (EESR) dated Sep. 6, 2018 issued in counterpart European Application No. 18158154.7.

*Primary Examiner* — Nicholas G Giles
(74) *Attorney, Agent, or Firm* — Holtz, Holtz & Volke PC (57) ABSTRACT

In an image processing apparatus, a characteristic acquisition unit acquires a characteristic of the projection object. A correction control unit determines a parameter in accordance with the characteristic and corrects an input image based on the parameter. A characteristic specifying unit specifies an attentional characteristic region based on the characteristic. A captured image acquisition unit acquires a captured image of a projection image. A change determination unit determines whether the attentional characteristic region changes by a predetermined amount or more from the input image and the captured image, causes the characteristic acquisition unit to acquire the characteristic if it is determined that the region changes, and redetermines to cause the correction control unit to produce a projection image.

12 Claims, 6 Drawing Sheets

(52) U.S. Cl.
CPC ............. *H04N 9/31* (2013.01); *H04N 9/3182* (2013.01); *H04N 9/3185* (2013.01); *H04N 9/3194* (2013.01)

(56) References Cited

U.S. PATENT DOCUMENTS

| | | | |
|---|---|---|---|
| 9,832,436 B1* | 11/2017 | Fuchikami | G06T 7/60 |
| 9,843,689 B1* | 12/2017 | Heller | H04N 1/00267 |
| 2004/0140982 A1 | 7/2004 | Pate | |
| 2009/0190046 A1* | 7/2009 | Kreiner | H04N 9/3182 |
| | | | 348/789 |
| 2011/0018897 A1 | 1/2011 | Uchiyama et al. | |
| 2011/0176007 A1 | 7/2011 | Ding et al. | |
| 2014/0340529 A1* | 11/2014 | Shibata | H04N 9/3185 |
| | | | 348/189 |
| 2015/0084992 A1* | 3/2015 | Wada | G06T 5/006 |
| | | | 345/647 |
| 2015/0103257 A1* | 4/2015 | Nakashin | H04N 9/3185 |
| | | | 348/746 |
| 2015/0254819 A1* | 9/2015 | Hara | G06T 5/006 |
| | | | 345/647 |
| 2016/0134849 A1* | 5/2016 | Wang | H04N 9/3147 |
| | | | 348/744 |
| 2016/0142691 A1* | 5/2016 | Kobiki | H04N 9/3182 |
| | | | 348/746 |
| 2017/0223322 A1* | 8/2017 | Grundhofer | H04N 9/3185 |
| 2018/0160086 A1 | 6/2018 | Naganuma | |

FOREIGN PATENT DOCUMENTS

| | | |
|---|---|---|
| WO | 2007072695 A1 | 6/2007 |
| WO | 2017006780 A1 | 1/2017 |

* cited by examiner

IMAGE PROCESSING APPARATUS, IMAGE PROCESSING METHOD, AND NON-TRANSITORY COMPUTER-READABLE STORAGE MEDIUM HAVING STORED THEREON IMAGE PROCESSING PROGRAM FOR CORRECTING AN IMAGE FOR PROJECTION

CROSS-REFERENCE TO RELATED APPLICATIONS

This application is based upon and claims the benefit of priority from the prior Japanese Patent Application No. 2017-060319, filed Mar. 27, 2017, the entire contents of which are incorporated herein by reference.

BACKGROUND OF THE INVENTION

1. Field of the Invention

The present invention relates to an image processing apparatus, an image processing method, and a non-transitory computer-readable storage medium having stored thereon an image processing program.

2. Description of the Related Art

To obtain a clear projection image by a projection apparatus, such as a projector, it is necessary to accurately position a projector and a projection object onto which images are projected. For example, JP2016-15639A discloses a technique for correcting a projection image, after once positioning a projection apparatus and then repositioning the same, to reproduce the previous projecting position.

The technique disclosed in JP2016-15639A is based on the assumption that the object onto which images are projected is a wall surface, and is not based on the assumption that images are projected onto an object, such as a curtain, which has irregularities, undulations, and colored designs.

BRIEF SUMMARY OF THE INVENTION

One embodiment of the present invention is an image processing apparatus comprising a processor, wherein the processor is configured to acquire a first characteristic of a projection object, generate a first projection image by correcting an input image to be input to a projector in accordance with the first characteristic, specify a region of an attentional characteristic in the projection object based on the first characteristic, acquire a post-projection captured image obtained by capturing the first projection image projected onto the projection object by the projector, determine whether the region of the attentional characteristic changes by comparing the region of the attentional characteristic included in the first projection image with the region of the attentional characteristic included in the post-projection captured image, in response to the determination of the change in the region of the attentional characteristic changes, acquire a second characteristic of the projection object, and generate a second projection image by correcting the input image based on the second characteristic.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

A detailed description below will provide a deep understanding of the present invention when taken into consideration together with the drawings.

DETAILED DESCRIPTION OF THE INVENTION

An embodiment of the present invention will be described with reference to the drawings.

Figure 1:
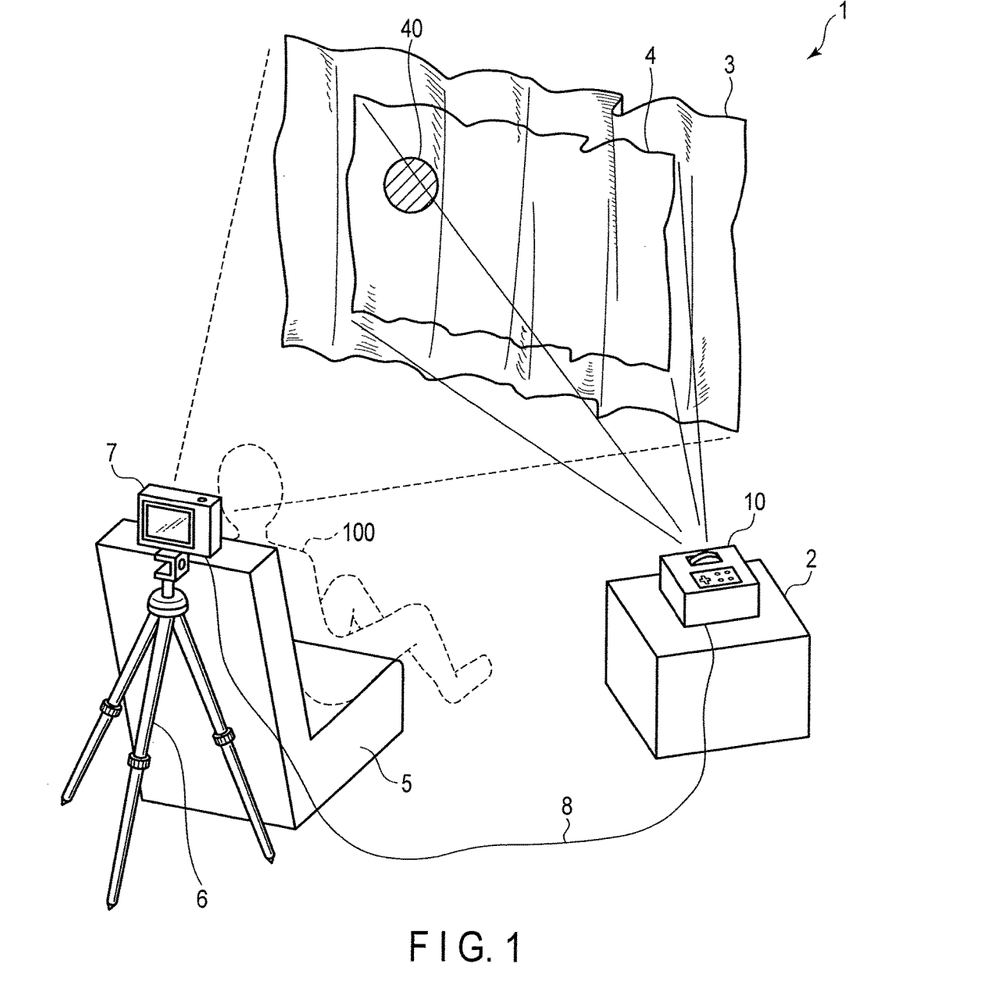
FIG. 1 is a view showing a state of a set condition of a projection system including a projection apparatus according to an embodiment of the present invention.

FIG. 1 is a view showing a state of a set condition of a projection system 1 including a projector 10 as a projection apparatus according to the embodiment. The projector 10 is disposed on a stand 2. The projector 10 projects a desired image on a curtain 3 in place of a dedicated screen. In FIG. 1, the projector 10 is placed at a position shifted from a center front of the curtain 3, for example, shifted right from the center front of the curtain 3. The projector 10 projects the image at the position toward the curtain 3.

The curtain 3 is a general curtain, which can be folded in an undulating manner. Even when the curtain 3 is spread to be used as a projection object, its surface has big undulations mainly along a horizontal direction. Therefore, a projection area 4, on which images are projected from the projector 10, also includes irregularities corresponding to the surface shape of the curtain 3.

The curtain 3 has a colored design. FIG. 1 shows a circular pattern 40 as an example of the colored design of the curtain 3. For example, the pattern 40 has a single color that is not white, and the other part (ground) of the curtain 3 excluding the pattern 40 also has a single color that is not white and is different from the color of the pattern 40. In embodiment, the pattern 40 is included in the projection area 4 of the curtain 3.

Thus, the curtain 3 as the projection object, onto which images are projected from the projector 10 in this embodiment, has a colored design and is not planar (not flat). The curtain 3 is openable and closable, and is easily movable.

A chair 5 for a viewer 100 is placed just in front of the curtain 3. A digital camera 7, as an image-taking device attached to a tripod 6, is placed at the position of the chair 5, as near as possible to the eyes of the viewer 100. In other words, the digital camera 7 is placed at an angle of view that allows the viewer 100 to view the projection area 4 on the curtain 3.

The digital camera 7 is wired to the projector 10 by, for example, a USB (Universal Serial Bus) cable 8. The digital camera 7 captures an image including the projection area 4 on the curtain 3 in accordance with a control signal input from the projector 10 through the USB cable 8, and sends out image data obtained by image-capturing to the projector 10 through the USB cable 8. Alternatively, the digital camera 7 and the projector 10 may be connected via a personal computer or the like, or may be integrated as one unit.

Figure 2:
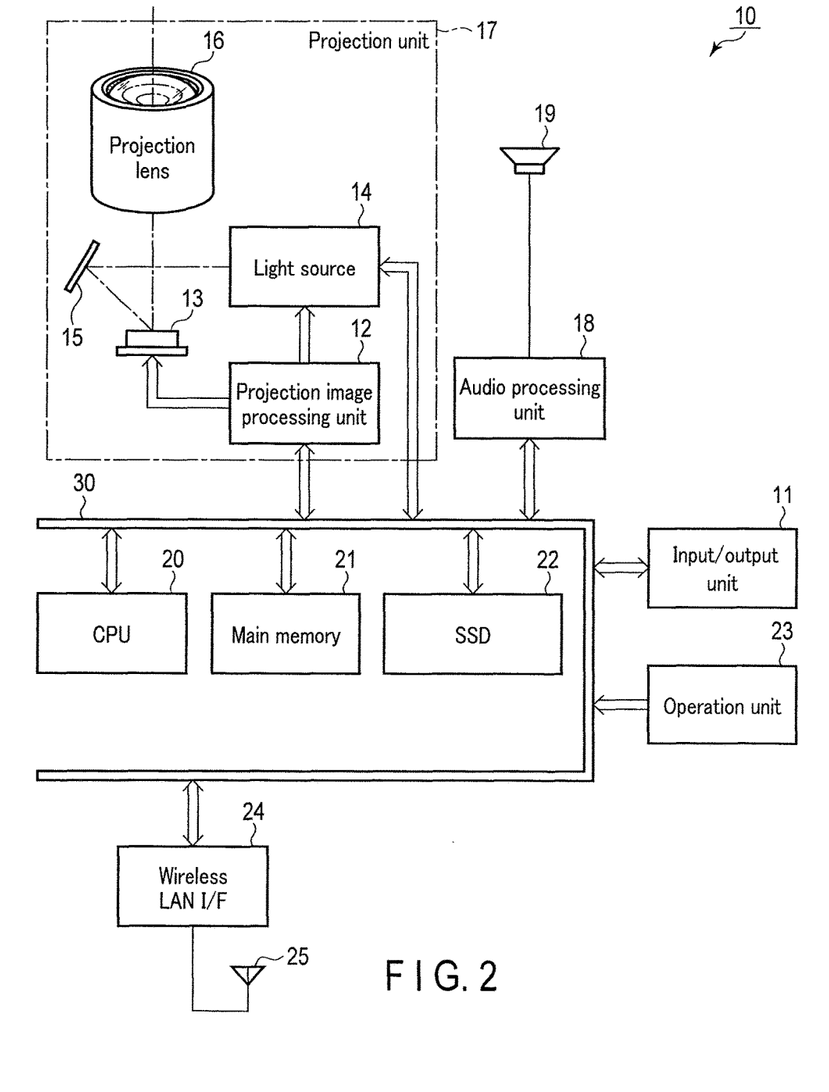
FIG. 2 is a block diagram showing a configuration example of the projection apparatus of the embodiment.

FIG. 2 is a block diagram showing a configuration example of the projector 10 of the embodiment. The projector 10 includes an input/output unit 11. The input/output unit 11 includes, for example, a pin jack (RCA)-type video input terminal, a D-sub15-type RGB input terminal, an HDMI (Registered Trademark) (High-Definition Multimedia Interface) terminal, a USB terminal, etc.

The projector 10 includes a projection image processing unit 12, a micromirror element 13, a light source 14, a mirror 15, and a projection lens 16, which constitute a projection unit 17.

An imaging signal of various standards, which is input to the input/output unit 11 or stored in a USB memory and selectively read out, is digitized in the input/output unit 11 when needed, and sent out to the projection image processing unit 12 through a bus 30.

The light source 14 cyclically emits light of primary colors of red (R), green (G), and blue (B) in a time-division manner. The light source 14 includes an LED (Light Emitting Diode), which is a semiconductor light-emitting element, and repeatedly emits light of primary colors of R, G, and B, in a time-division manner. The LED may include a LD (Laser Diode or semiconductor laser) and an organic EL (Electro-Luminescence) element as an LED in a broad sense. The light of the primary colors from the light source 14 is totally reflected by the mirror 15 and applied to the micromirror element 13.

The projection image processing unit 12 drives the micromirror element 13 in accordance with sent image data in a time-division driving at a frame rate corresponding to a predetermined format; for example, if the frame rate of the input image data is 60 fps, at a higher rate calculated by multiplying a division number of color components and the number of levels of display gray scales by 120 fps, which is twice 60 fps. The micromirror element 13 turns on and off inclination angles of micromirrors of hundreds of thousands to millions, for example, 1280 pixels in length×960 pixels in width, which are arranged in an array, so that a light image is formed by the light reflected by the micromirror element 13. The formed light image is projected outside via the projection lens 16.

The projector 10 includes an audio processing unit 18 and a speaker unit 19. If an image signal input from the input/output unit 11 includes an audio signal, the audio signal is separated from the image signal in the input/output unit 11, and sent out to the audio processing unit 18 through the bus 30. The audio processing unit 18 includes an audio source circuit, such as a PCM audio source, converts an audio signal given during a projection operation to an analog signal, drives the speaker unit 19 to emit sound, or generates a beep sound or the like when needed.

A CPU (Central Processing Unit) 20 controls operations of circuits of the aforementioned configurations included in the projector 10. The CPU 20 is connected to a main memory 21 and an SSD (Solid State Drive) 22. The main memory 21 is constituted by, for example, a SRAM (Static Random Access Memory) and functions as a work memory of the CPU 20. The SSD 22 is constituted by an electrically rewritable nonvolatile memory, for example, and stores various operation programs executed by the CPU 20, including a correction setting program and a remeasurement determination program which are described later, and stores various fixed data such as an image for OSD (On Screen Display) superimposed on an image to be a base.

The CPU 20 reads the operation programs, the fixed data, etc. stored in the SSD 22, develops and stores them in the main memory 21, and executes the programs, thereby integrally controlling the projector 10.

The CPU 20 executes various projection operations in accordance with an operation signal received through the bus 30 from the operation unit 23. The operation unit 23 includes an operation key provided in the main body of the projector 10 or a receiver that receives an infrared modulation signal from a remote controller (not shown) specialized for the projector 10. For example, the operation unit 23 receives the operation signal in the receiver, and sends out a signal corresponding to the received operation signal to the CPU 20 through the bus 30.

The CPU 20 is connected to a wireless LAN interface (I/F) 24 through the bus 30. The wireless LAN interface 24 transmits and receives data to and from an external device by wireless communication connection via a wireless LAN antenna 25 in compliance with, for example, IEEE 802.11a/11b/11g/11n standards.

An operation example of the projector 10 according to the embodiment will be described. In the embodiment, the projector 10 includes an image processor, and allows projection of a satisfactory image in accordance with a change in projection conditions.

Figure 3:
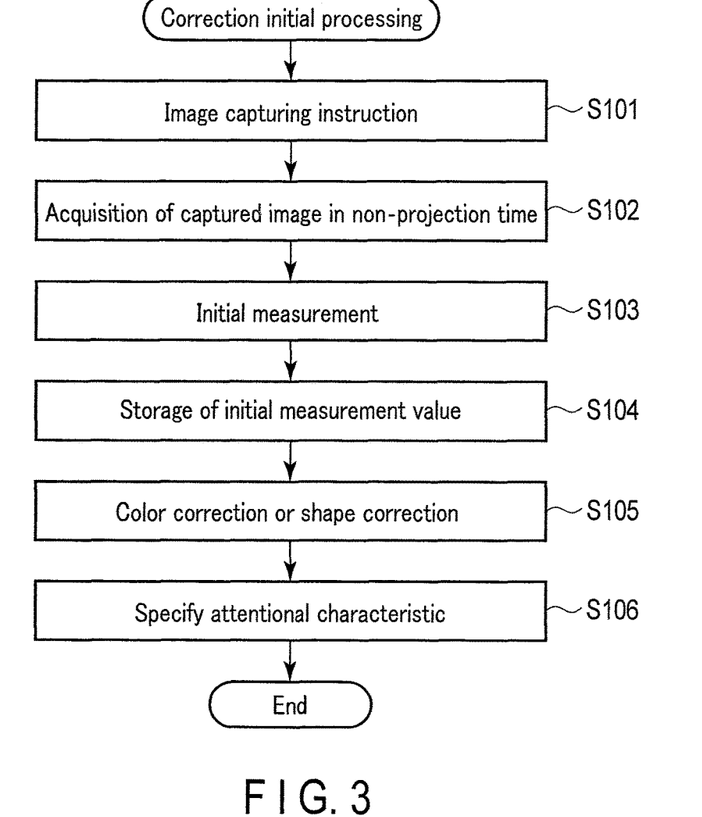
FIG. 3 is a diagram showing an example of a flow of correction initial processing.

FIG. 3 is a diagram showing an example of a flow of correction initial processing. The flow shows contents of processing which the CPU 20 executes, after reading them from the correction setting program in the SSD 22, and developing and storing them in the main memory 21.

In step S101, the CPU 20 sends an image capturing instruction to the digital camera 7 via the input/output unit 11. The digital camera 7 captures an image of the curtain 3 including the projection area 4 in accordance with the image capturing instruction. The image of the curtain 3 includes the projection area 4 when not being projected. In other words, the digital camera 7 captures an image of the projection area 4 in a state where the projector 10 does not perform projection.

In step S102, the CPU 20, as a captured image acquisition unit, acquires the image captured in step S101 from the digital camera 7. The CPU 20 acquires a captured image data sent out from the digital camera 7 via the input/output unit 11.

In step S103, the CPU 20 executes initial measurement to perform a color correction and a shape correction of the image projected from the projector 10. The initial measurement is started by, for example, pressing the operation key of the operation unit 23 by the user.

The color correction is a correction made when projection is performed on a colored pattern, to compensate for the color of the design and to reproduce the color displayed when projection is performed on a white screen, that is, the originally intended color to be projected, even on the colored pattern. The shape correction is a geometric correction to allow the viewer 100 to see a projection image without a distortion, even when the image is projected on a projection object having irregularities or undulations.

In the initial measurement, the CPU 20 causes the projector 10 to project, for example, a gray code pattern on the projection area 4 of the curtain 3. Then, upon receipt of the image capturing instruction from the CPU 20, the digital camera 7 captures an image of the projection area 4 in which the gray code pattern is projected. The CPU 20 acquires the captured image data taken by the digital camera 7 and input image data input to the projector 10, calculates a correspondence relation between a pixel (camera pixel) of the captured image data and a pixel of the input image data (projector pixel), and produces pixel correspondence data. To obtain a projector pixel corresponding to a camera pixel, generally, the position of the corresponding projector pixel is roughly measured, and thereafter a high-definition positional correspondence relation is obtained. For example, projector pixels are gradually narrowed down by a binary search using the gray code, and when they are narrowed to a certain extent, high-definition position detection is performed by a phase shift method. The produced pixel correspondence data specifies the correspondence relation between a value of the pixel that the projector 10 outputs and a value of the pixel used by the digital camera 7 to capture an image.

With regard to the color correction, the CPU 20 calculates a parameter necessary to perform the color correction for the camera pixel and the projector pixel corresponding to each other. For example, the projector 10 projects an all-black image and an all-white image on the projection area 4 separately. The digital camera 7 then captures an image including the projection area 4 in the black projection state and an image including the projection area 4 in the white projection state. The CPU 20 acquires black image data and white image data captured by the digital camera 7 separately. The CPU 20 calculates parameters necessary for the color correction based on the pixel correspondence data, and the acquired black image data and white image data for each pixel of the projection area 4, and produces color correction parameter data. For example, the CPU 20 produces the color correction parameter data by feeding back output values of the projector pixels corresponding to the all-black image and the all-white image, so that a camera image has uniform and correct colors.

With regard to the shape correction, the CPU 20 produces meshes for each image data using the pixel correspondence data to associate the data, calculates conversion parameters necessary for the shape correction between input image data and output image data to be output to the projection unit 17 as an image output unit, and produces shape correction parameter data.

The initial settings of the color correction and the shape correction described above are mere examples, and can be achieved by various methods known to a person skilled in the art.

In step S104, the CPU 20 causes the SSD 22 to store the initial measurement values, such as the pixel correspondence data, the color correction parameter data, and the shape correction parameter data that are acquired in step S103.

In step S105, the CPU 20 performs the color correction or the shape correction using the results of the initial measurement in step S103.

When the color correction is performed, for example, the CPU 20 changes values of the respective pixels output from the projector 10 based on the pixel correspondence data and the color correction parameter data, so that the image captured by the digital camera 7 can be of desired colors and uniform brightness. The projection unit 17 of the projector 10 projects the color-corrected image onto the projection area 4. Similarly, when the shape correction is performed, the CPU 20 performs the shape correction based on the pixel correspondence data and the shape correction parameter data, so that the shape-corrected image is projected onto the projection area 4.

In step S106, the CPU 20 acquires a characteristic included in the projection area 4 from the captured image data acquired in step S102, or from the initial measurement values, such as the shape correction parameter data acquired in step S103. Then, the CPU 20, as a characteristic specifying unit, specifies a characteristic to be noted (attentional characteristic) for remeasurement from the acquired characteristics. The characteristics included in the projection area 4 include characteristics relating to colored designs (colored design characteristics), and characteristics relating to geometric shapes (shape characteristics), such as undulations, irregularities, and steps. The colored design characteristics can be acquired from, for example, luminance information of each pixel in the projection area 4 included in the captured image data, or from the color correction parameter data. The shape characteristics can be acquired from, for example, the shape correction parameter data.

Thus, the CPU 20, as a characteristic acquisition unit, acquires characteristics in the projection area 4 in the curtain 3 as the projection object in step S102. Furthermore, as a correction control unit, the CPU 20 determines a correction parameter in accordance with the characteristics in step S103, and corrects an output image to be output to the projection unit 17 based on the correction parameter. Moreover, as the characteristic specifying unit, the CPU 20 specifies an attentional characteristic regarding re-correction from the characteristics.

The term "attentional characteristic" means a characteristic that greatly influences a physical appearance of a projection image due to the color correction or shape correction based on the initial measurement, if the projector 10, the curtain 3, or the digital camera 7 moves and changes their relative position.

For example, it is assumed that the projection area 4 includes a pattern 40 of a single color, and that the base color of the curtain 3 is a light color, while the color of the pattern 40 is a dark color. In this case, when the relative position changes even slightly, if the boundary between the color of the pattern 40 and the base color is shifted, the influence of the color correction based on the initial measurement can be significant. In other words, an edge due to the color correction to compensate for the color of the pattern 40 can appear sharp. Therefore, the boundary between the pattern 40 and the base color and a periphery thereof should be an attentional characteristic.

In contrast, in the case where both the curtain 3 and the pattern 40 are a light color, if the relative position changes only slightly, the influence of the color correction is less significant. Therefore, in such a case, the pattern 40 need not be an attentional characteristic.

Besides, for example, in the case where the pattern 40 has a high-relative luminosity color (e.g., green), if the boundary between the color of the pattern 40 and the base color is shifted even slightly, the influence of the color correction is liable to appear significant. Therefore, the boundary between the pattern 40 and the base color and a periphery of the boundary should be an attentional characteristic.

Furthermore, for example, in the case where a left half part of the projection area 4 is white and a right half part thereof is of a single dark color to form a clearly visible boundary between the two parts, an edge due to the color correction to compensate for the colors appears sharp, and such physical appearance causes a significant feeling of incongruence. In other words, since the correction to compensate for a dark color is performed in the color correction of the correction initial processing, even a slight shift produces a sharp edge. Therefore, in such a case, the boundary and a periphery thereof should be an attentional characteristic.

In contrast, even in the case where the projection area 4 is divided into two parts of different colors at a boundary, if the two colors are similar colors, such as orange and red, the physical appearance of a slight shift causes a little to no feeling of incongruence. Similarly, in the case where the projection area 4 includes gradations in color with vague boundaries, for example, where the colors gradually change from blue in the left to red in the right having vague boundaries, the physical appearance of a slight shift causes little to no feeling of incongruence. Therefore, in such a case, no attentional characteristic is specified.

As described above, attentional characteristics relating to colored design characteristics are set in consideration of a color phase, chromaticness, brightness, etc. altogether, based on, for example, a difference in hue. For example, with regard to brightness, there is a large error in a bright part of an image, and a small error in a dark part. Therefore, a dark part of an image is specified as an attentional characteristic.

For example, with regard to the shape correction, a part where the projection image is partially miniaturized to a large degree is considered to have an extreme shape; therefore, the extremeness in shape is determined indirectly from an image captured by the digital camera 7. In other words, an attentional characteristic in the shape characteristics is specified based on a degree of reduction of captured image data relative to input image data. In particular, if the shape characteristic is a step, even a slight shift in the step can produce a sharp edge; therefore, the step portion and a periphery thereof should be an attentional characteristic.

As described above, attentional characteristics relating to shape characteristics are also set in overall consideration of extremeness of a change in shape etc.

Therefore, in step S106, with regard to the colored design characteristics, the CPU 20 determines, for example, a pattern as an attentional characteristic if there is a great difference in hue between the base color and the color of the pattern in the projection area 4, and acquires positional coordinates of the area corresponding to the pattern. With regard to the shape characteristics, the CPU 20 determines, for example, a part where there is a great change in angle due to undulations of the shape, as an attentional characteristic, and acquires positional coordinates of the area corresponding to the part.

In this embodiment, in step S106, the CPU 20 as the characteristic specifying unit specifies in advance, as an attentional characteristic, a part on which a great influence on the physical appearance of a projection image is expected to be caused due to the color correction or shape correction based on the initial measurement, if the projector 10, the curtain 3, or the digital camera 7 moves and changes their relative position. After step S106, the correction initial processing is ended.

The following is an explanation of remeasurement determination that is performed as needed after the correction initial processing described above, while the projector 10 is projecting a color-corrected or shape-corrected input image as a projection image on the projection area 4 of the curtain 3.

Figure 4:
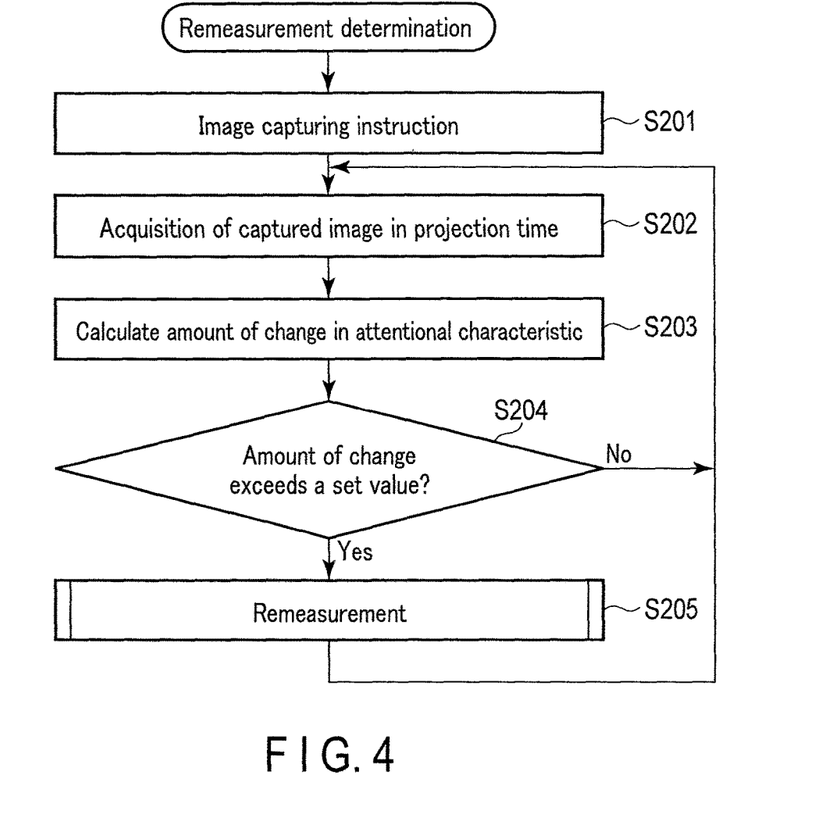
FIG. 4 is a diagram showing an example of a flow of remeasurement determination.

FIG. 4 is a diagram showing an example of a flow of remeasurement determination. The flow shows contents of processing which the CPU 20 executes, after reading them from the remeasurement determination program in the SSD 22, and developing and storing them in the main memory 21.

In the following explanation, image data input to the input/output unit 11 of the projector 10 is referred to as "input image data", image data corrected by the correction setting program in the CPU 20 of the projector 10 and projected onto the projection object from the projection unit 17 is referred to as "corrected image data", an image projected in the projection area 4 based on the corrected image data projected onto the projection object is referred to as "a projection image", an image obtained by capturing the projection image by the digital camera 7 is referred to as "a captured image", and image data of the captured image is referred to as "captured image data".

In step S201, the CPU 20 automatically sends an image capturing instruction via the input/output unit 11 to the digital camera 7 used in the initial measurement. The digital camera 7 captures the projection image in accordance with the image capturing instruction. The frequency of the image capturing instruction can be set appropriately in the remeasurement determination program. In this embodiment, it is assumed that the CPU 20 always sends the image capturing instruction.

In step S202, the CPU 20, as the captured image acquisition unit, acquires the image captured in step S201 from the digital camera 7. The CPU 20 acquires captured image data sent out from the digital camera 7 via the input/output unit 11.

In step S203, the CPU 20 performs distortion correction, correction of peripheral brightness, color space conversion, etc. for the captured image data acquired in step S202, and thereafter compares the captured image data with the input image data based on the attentional characteristic specified instep S106 of the correction initial processing to calculate an amount of change (amount of shift) in the region of the attentional characteristic.

If the CPU 20 appropriately corrects the input image data based on the correction initial processing and produces the corrected image data, and the projection unit 17 performs projection based on the corrected image data, the captured image data should coincide with the input image data. In this case, the amount of change in the region of the attentional characteristic is 0. However, if a projection condition changes, for example, if the projector 10, the digital camera 7, or the curtain 3 moves and their relative position changes from that in the initial measurement, or if a setting environment changes, there is an amount of change in the region of the attentional characteristic.

In step S204, the CPU 20 determines whether the amount of change in the region of the attentional characteristic calculated in step S203 exceeds a set value. In other words, when the projection unit 17 projects corrected image data obtained by correcting input image data as a projection image, the CPU 20 as a change determination unit compares the input image and the projection image and determines whether the region of the attentional characteristic changes by a predetermined amount or more.

In this embodiment, when the captured image data and the input image data are compared and even if there is a difference therebetween, remeasurement is not necessarily performed. A threshold is set for the amount of change in the region of the attentional characteristic, and only if the amount of change exceeds the threshold (Yes in step S204), the process proceeds to step S205 and remeasurement is performed. In other words, only when the CPU 20 as the change determination unit determines that the region of the attentional characteristic changes by a predetermined amount or more, the CPU 20 redetermines the correction parameter. The threshold of the amount of change is a value that is set appropriately for each attentional characteristic in the remeasurement determination program in accordance with a colored design characteristic or a shape characteristic of the attentional characteristic.

Figure 5A:
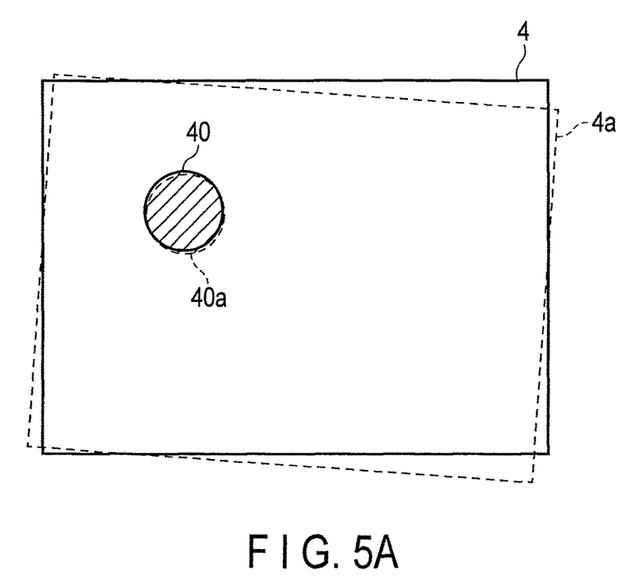
FIG. 5A is a view showing an example of a shift of a projection object onto which images are projected and which includes an attentional characteristic.

For example, assume that the projection area 4 including the pattern 40 as an attentional characteristic (colored design characteristic) is shifted and the positions of the pattern 40 and the projection area are shifted to a pattern 40a and a projection area 4a as indicated by broken lines in FIG. 5A. In this case, although the projection area 4 is shifted, the pattern 40a is not substantially shifted; therefore, the amount of change in the region of the attentional characteristic is small. Therefore, in this case, the CPU 20 determines that the amount of change in the region of the attentional characteristic does not exceed the set value, and does not perform the remeasurement.

Figure 5B:
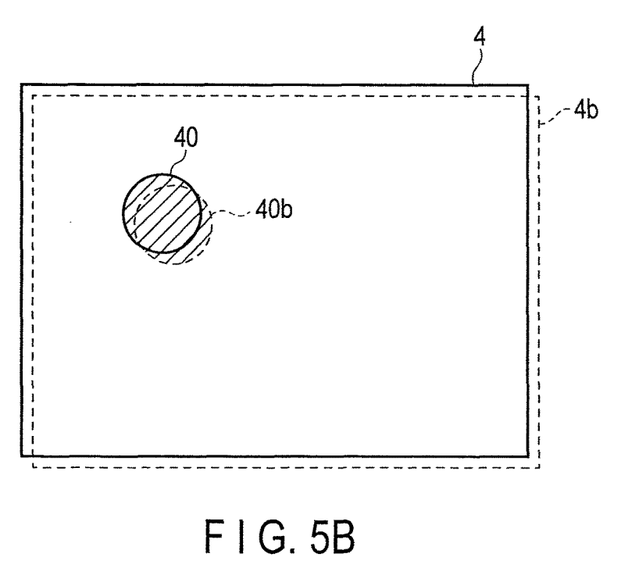
FIG. 5B is a view showing an example of a shift of a projection object onto which images are projected and which includes an attentional characteristic.

On the other hand, assume that the projection area 4 including the pattern 40 is shifted and the positions of the pattern 40 and the projection area are shifted to a pattern 40b and a projection area 4b as indicated by broken lines in FIG. 5B. In this case, both the projection area 4 and the pattern 40b are considerably shifted and the amount of change in the region of the attentional characteristic is large. Therefore, in this case, the CPU 20 determines that the amount of change in the region of the attentional characteristic exceeds the set value, and performs the remeasurement.

For example, when the CPU 20 compares an input image and a projection image and determines whether to perform remeasurement for color correction or shape correction, the narrower the areas to be compared, the lighter the load of the processing in the CPU 20. Thus, if the CPU 20 specifies a part of the region of the attentional characteristic in advance, the load of processing is less than that necessary for inspecting the overall image every time. For example, if the attentional characteristic is the colored circle pattern 40, if only the pixels at some points in a boundary part between the color of the pattern and the base color, the load of processing in remeasurement determination can be light.

In this embodiment, instep S106 of the correction initial processing described above, the CPU 20 specifies in advance a part of the attentional characteristic to be noted for remeasurement included in the projection area 4, namely, a part where the physical appearance is liable to cause a feeling of incongruence to the viewer. In step S204, only when a shift occurs in the part of the attentional characteristic does the CPU 20 perform remeasurement for correction again. In other words, in this embodiment, correction data is produced again only when a shift occurs in a part including a sharp edge, that is, a part of geometric shapes including undulations or irregularities.

On the other hand, if the amount of change does not exceed the set value (No in step S204), the processing returns to step S201, and the steps subsequent to step S201 are repeated. More specifically, when the relative position of the projector 10 or the projection area 4 on the curtain 3 does not change from the initial setting, or even when it changes, if the amount of change is smaller than the threshold, remeasurement is not performed, and the projector 10 continues to carry out projection with the present color correction or shape correction.

Figure 6:
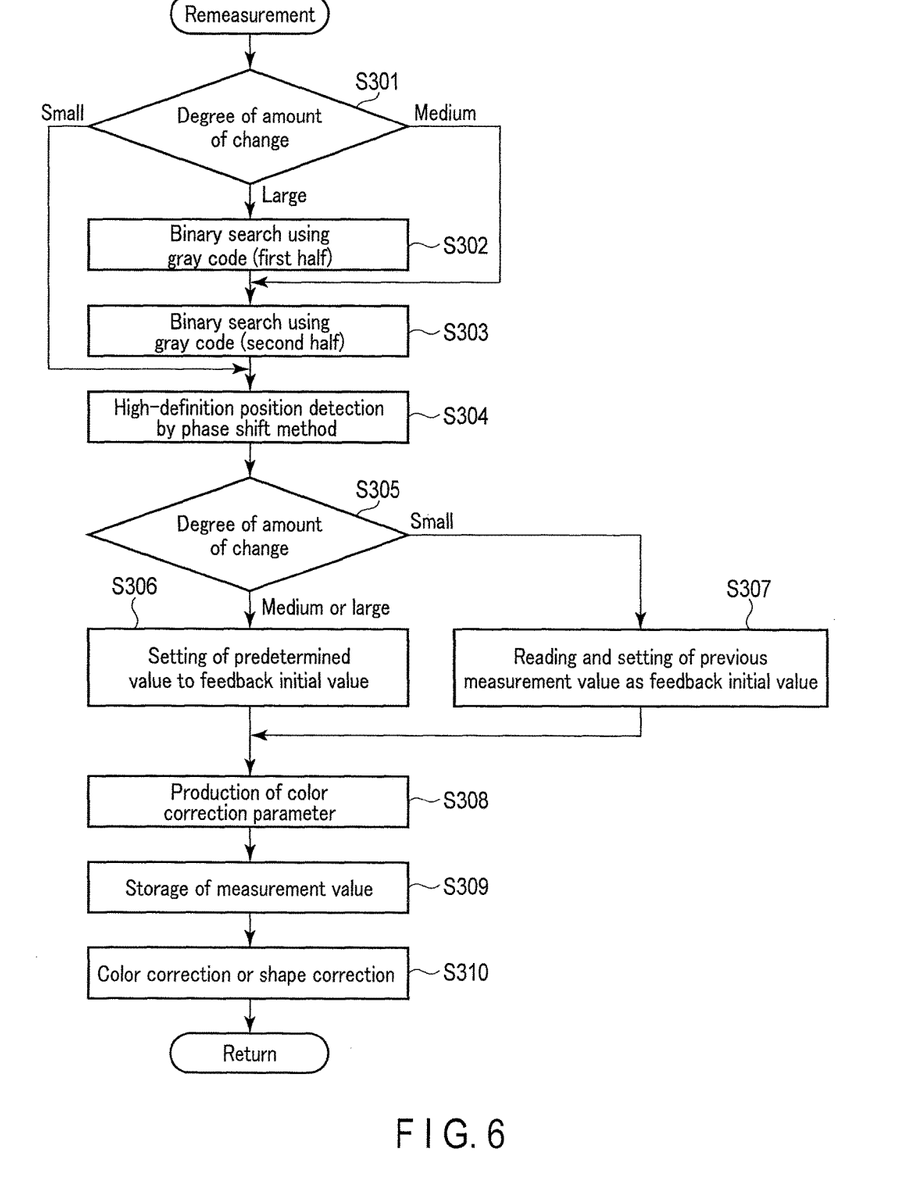
FIG. 6 is a diagram showing an example of a flow of remeasurement.

FIG. 6 is a diagram showing an example of a flow of remeasurement executed by the CPU 20 in step S205.

In step S301, the CPU 20 determines a degree of the amount of change calculated in step S204. As described above in connection with step S103 of the correction initial processing, to obtain a projector pixel corresponding to a camera pixel, the CPU 20 gradually narrows down projector pixels by the binary search using the gray code, and when they are narrowed to a certain extent, high-definition position detection is performed by the phase shift method. If there is a small difference in projection condition between the remeasurement and the initial measurement, rough position measurement in a first half of the binary search can be skipped, and only a second half of the binary search may be sufficient. If the difference is smaller, the binary search is unnecessary and a position can be specified with high accuracy only by the phase shift method.

Therefore, if the CPU 20 determines that the degree of the amount of change in the region of the attentional characteristic is large in step S301 (step S301—Large), the processing proceeds to step S302. Then, the CPU 20 performs the ordinary binary search using the gray code. In step S302, rough position measurement by the binary search (a first half of the binary search using the gray code) is performed, and in step S303, position measurement for a narrower scope of search in the binary search (a second half of the binary search using the gray code) is performed. Subsequently, the processing proceeds to S304.

If the CPU 20 determines that the degree of the amount of change in the region of the attentional characteristic is medium (step S301—Medium), the processing proceeds to step S303. Then, the CPU 20 performs the second half of the binary search using the gray code. Thus, step S302 is skipped, and position measurement for a narrower scope of search in the binary search is performed in step S303. Subsequently, the processing proceeds to S304.

If the CPU 20 determines that the degree of the amount of change in the region of the attentional characteristic is small (step S301—Small), the CPU 20 does not perform the binary search and the processing proceeds to step S304. Thus, steps S302 and S303 are skipped.

As described above, the CPU 20 selects an arithmetic algorithm to be used, in accordance with the amount of change in the region of the attentional characteristic. As a result, rough position measurement can be skipped.

In step S304, the CPU 20 performs a high-definition position detection by the phase shift method. As a result, a new positional correspondence relation between a camera pixel and a projector pixel is obtained.

In step S305, based on the degree of the amount of change determined in step S301, the CPU 20 proceeds to step S306 if the degree is determined to be medium or large, and to step S307 if the degree is determined to be small.

In step S306, the CPU 20 sets a feedback initial value for producing a color correction parameter to a predetermined value. Then, the processing proceeds to step S308, in which the CPU 20 produces the color correction parameter data by feeding back output values of the projector pixels corresponding to, for example, the all-black image and the all-white image based on the set feedback initial value, so that a camera image has uniform and correct colors.

In step S307, the CPU 20 sets the previous measurement value (for example, the initial measurement value stored in step S105) as a feedback initial value for producing a color correction parameter. Thereafter, the processing proceeds to step S308, in which the color correction parameter data as described above is produced. At this time, by setting the feedback initial value to the previous measurement value, the number of times of feedback can be reduced, if the difference from the result of the previews measurement is small.

In step S309, the CPU 20 stores measurement values obtained in steps S301 to S308. In step S310, the CPU 20 performs color correction and shape correction based on results of measurement in steps S301 to S308.

As described above, in the embodiment, when the projector 10 projects an image on a projection object, which is not a dedicated screen but has a colored design or is not planar, the CPU 20 first acquires information on the colored design or shape in the projection area 4 of the projection object. Then, the CPU 20 performs color correction and shape correction for input image data using known color correction and shape correction techniques, and the projection unit 17 of the projector 10 performs projection based on the corrected image data, so that the projection image can be an image of a corrected color and corrected shape as desired. The CPU 20 specifies, from the acquired information of the colored design or shape, an attentional characteristic which may affect an image quality when the relative position between any of the projector 10, the digital camera 7, and the curtain 3 even slightly changes.

Then, the CPU 20 acquires a projection image as a captured image during projection based on the corrected image data, and compares the input image data and the captured image data. Only when the amount of change in the region of the attentional characteristic exceeds a set value does the CPU 20 determine that the projection image is affected by a change in projection conditions, and executes remeasurement.

For example, if the attentional characteristic is a colored design characteristic, the CPU 20 compares the input image data with the captured image data based on the color correction parameter. When the amount of change in the region exceeds the set value, the CPU 20 redetermines the color correction parameter. If the attentional characteristic is a shape characteristic, the CPU 20 compares the input image data with the captured image data based on the shape correction parameter. When the amount of change in the region exceeds the set value, the CPU 20 redetermines the shape correction parameter. If the attentional characteristic includes both a colored design characteristic and a shape characteristic, the CPU 20 compares the input image data with the captured image data based on the color correction parameter and the shape correction parameter. When the amount of change in the region exceeds the set value, the CPU 20 redetermines the color correction parameter or the shape correction parameter, or both.

Furthermore, when the amount of change in the region exceeds the set value because of a change in projection condition, if the amount of change is small, rough position measurement can be skipped by utilizing results of the previous measurement. Also, the number of times of feedback can be reduced by setting the feedback initial value in color measurement or shape measurement to the previous measurement value.

According to the present embodiment, when a projection condition changes, the CPU 20 performs remeasurement in accordance with the amount of change in the region of the attentional characteristic, thereby saving some steps of remeasurement. In particular, the measurement for color correction or shape correction in a projector like this embodiment, which acquires a characteristic in the projection area and corrects projection image data in accordance with the characteristic, generally requires several seconds to several tens of seconds as a measurement time by a CPU mounted on this apparatus. It is not preferable to perform measurement again, when remeasurement is performed due to a shift that occurs during image projection, in terms of time consumption and also in terms of interruption of the projection of an image due to projection of the gray code pattern again in the remeasurement time. Therefore, even if a shift occurs, unless its physical appearance causes a feeling of incongruence to the viewer, remeasurement should preferably be avoided as far as possible.

In this embodiment, if the influence of a shift on the viewer's eyes is small, the projection is continued without reproducing correction data again; correction data is reproduced only if the influence is large to a certain extent. Therefore, it is possible to provide an image processing apparatus, an image processing method, and an image processing program that can project a satisfactory image by a projection apparatus in accordance with a change in projection conditions without raising the aforementioned problems of time consumption or interruption of the projection of an image.

In the embodiment described above, the functions of the image acquisition unit, the characteristic acquisition unit, the correction control unit, the characteristic specifying unit, the captured image acquisition unit, and the change determination unit are implemented by the CPU 20; however, they may be implemented by a hardware circuit, such as an FPGA (Field-Programmable Gate Array) or an ASIC (Application Specific Integrated Circuit).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claims is:

1. An image processing apparatus comprising a processor, wherein the processor is configured to:
    acquire a first characteristic of a projection object;
    generate a first projection image by correcting an input image to be input to a projector in accordance with the first characteristic;
    specify a region of an attentional characteristic in the projection object based on the first characteristic;
    acquire a post-projection captured image obtained by capturing the first projection image projected onto the projection object by the projector;
    determine whether the region of the attentional characteristic changes by comparing the region of the attentional characteristic included in the first projection image with the region of the attentional characteristic included in the post-projection captured image;
    in response to the determination of the change in the region of the attentional characteristic, acquire a second characteristic of the projection object; and
    generate a second projection image by correcting the input image based on the second characteristic.

2. The image processing apparatus according to claim 1, wherein the region of the attentional characteristic includes a region, in which a degree of correction is high, in an image region of the first projection image corrected based on the first characteristic.

3. The image processing apparatus according to claim 1, wherein the processor is configured to:

acquire, by controlling image sensor a pre-projection captured image obtained by capturing the projection object onto which no projection image is projected; and acquire the first characteristic from the pre-projection captured image obtained by capturing the projection object;

wherein the region of the attentional characteristic of the projection object is a region in which a hue of the region of the attentional characteristic greatly differs from a hue of a region adjacent to the region of the attentional characteristic in an image region of the pre-projection captured image.

4. The image processing apparatus according to claim 1, wherein:

the processor is configured to:

acquire, by controlling image sensor, a pre-projection captured image obtained by capturing the projection object onto which no projection image is projected; and acquire the first characteristic from the pre-projection captured image obtained by capturing the projection object;

wherein the region of the attentional characteristic of the projection object is a region in which a projection surface shape of the region of the attentional characteristic greatly differs from a projection surface shape of a region adjacent to the region of the attentional characteristic in an image region of the pre-projection captured image.

5. The image processing apparatus according to claim 1, wherein the processor is configured to:

compare the region of the attentional characteristic included in the first projection image with the region of the attentional characteristic included in the post-projection captured image; and acquire the second characteristic, in response to an amount of change of the region of the attentional characteristic is equal to or greater than a predetermined threshold.

6. The image processing apparatus according to claim 1, wherein the processor is configured to:

calculate an amount of change of the region of the attentional characteristic by comparing the region of the attentional characteristic included in the first projection image with the region of the attentional characteristic included in the post-projection captured image; and acquire the second characteristic by executing one of characteristic acquisition processing by a plurality of pattern projections in accordance with the amount of change, in response the determination of the change in the region of the attentional characteristic.

7. The image processing apparatus according to claim 1, wherein:

the first characteristic is a color; and the processor specifies the region of the attentional characteristic based on the color.

8. The image processing apparatus according to claim 7, wherein a correction parameter for use in processing of correcting the first projection image is a color correction parameter.

9. The image processing apparatus according to claim 1, wherein:

the first characteristic is a shape; and the processor specifies the region of the attentional characteristic based on the shape.

10. The image processing apparatus according to claim 9, wherein a correction parameter for use in processing of correcting the first projection image is a shape correction parameter.

11. An image processing method comprising:

acquiring a first characteristic of a projection object;

generating a first projection image by correcting an input image to be input to projector in accordance with the first characteristic;

specifying a region of an attentional characteristic in the projection object based on the first characteristic;

acquiring a post-projection captured image obtained by capturing the first projection image projected onto the projection object by the projector;

determining whether the region of the attentional characteristic changes by comparing the region of the attentional characteristic included in the first projection image with the region of the attentional characteristic included in the post-projection captured image;

acquiring a second characteristic of the projection object, in response to the determination of the change in the region of the attentional characteristic; and generating a second projection image by correcting the input image based on the second characteristic.

12. A non-transitory computer-readable storage medium having stored thereon an image processing program executable by a computer of an image processing apparatus, the image processing program controlling the computer to perform functions comprising:

acquiring a first characteristic of a projection object;

generating a first projection image by correcting an input image to be input to projector in accordance with the first characteristic;

specifying a region of an attentional characteristic in the projection object based on the first characteristic;

acquiring a post-projection captured image obtained by capturing the first projection image projected onto the first projection object by the projector;

determining whether the region of the attentional characteristic changes by comparing the region of the attentional characteristic included in the first projection image with the region of the attentional characteristic included in the post-projection captured image;

acquiring a second characteristic of the projection object, in response to the determination of the change in the region of the attentional characteristic; and generating a second projection image by correcting the input image based on the second characteristic.

* * * * *

UNITED STATES PATENT AND TRADEMARK OFFICE
CERTIFICATE OF CORRECTION

PATENT NO. : 10,225,464 B2
APPLICATION NO. : 15/902997
DATED : March 5, 2019
INVENTOR(S) : Tetsuro Narikawa

Page 1 of 1

It is certified that error appears in the above-identified patent and that said Letters Patent is hereby corrected as shown below:

On the Title Page

Item [74], delete "Holtz, Holtz & Volke PC" and insert --Holtz, Holtz & Volek PC--.

Signed and Sealed this
Twenty-eighth Day of May, 2019

Andrei Iancu
*Director of the United States Patent and Trademark Office*